United States Patent
Ejiri et al.

(10) Patent No.: US 8,413,242 B2
(45) Date of Patent: Apr. 2, 2013

(54) EXTERNAL STORAGE DEVICE AND METHOD OF CONTROLLING THE DEVICE

(75) Inventors: Taichi Ejiri, Nagoya (JP); Tsukasa Ito, Nagoya (JP); Suguru Ishii, Nagoya (JP)

(73) Assignee: Buffalo Inc., Nagoya (JP)

( * ) Notice: Subject to any disclaimer, the term of this patent is extended or adjusted under 35 U.S.C. 154(b) by 276 days.

(21) Appl. No.: 12/752,848

(22) Filed: Apr. 1, 2010

(65) Prior Publication Data

US 2010/0257377 A1     Oct. 7, 2010

(30) Foreign Application Priority Data

Apr. 3, 2009     (JP) .................................. 2009-091482

(51) Int. Cl.
*G06F 11/00* (2006.01)
*G06F 12/14* (2006.01)

(52) U.S. Cl. ............. 726/23; 726/27; 713/189; 713/193

(58) Field of Classification Search .................. 713/165, 713/182, 183, 189, 193; 726/2, 4, 5, 16–18, 726/21, 26–30; 709/212; 711/100, 163, 711/164, E12.001, E12.091–E12.093
See application file for complete search history.

(56) References Cited

U.S. PATENT DOCUMENTS

| | | | |
|---|---|---|---|
| 7,284,132 B2 * | 10/2007 | Nakabe et al. ................. | 713/182 |
| 7,356,707 B2 * | 4/2008 | Foster et al. ................... | 713/189 |
| 7,689,836 B2 * | 3/2010 | Nagase et al. ................. | 713/189 |
| 7,889,863 B2 * | 2/2011 | Harada et al. ................. | 380/201 |
| 7,917,962 B2 * | 3/2011 | Allen ............................... | 726/29 |
| 7,941,674 B2 * | 5/2011 | Ziv et al. ........................ | 713/189 |
| 8,065,523 B2 * | 11/2011 | Fujii et al. ...................... | 713/165 |
| 2008/0120726 A1 * | 5/2008 | Tsunehiro et al. .............. | 726/27 |
| 2008/0178283 A1 * | 7/2008 | Pratt et al. ....................... | 726/19 |
| 2010/0174902 A1 * | 7/2010 | Wang .............................. | 713/165 |
| 2010/0250957 A1 * | 9/2010 | Cuppett ......................... | 713/186 |

FOREIGN PATENT DOCUMENTS

| | | |
|---|---|---|
| JP | 08-138307 A | 5/1996 |
| JP | 2001-249849 A | 9/2001 |
| JP | 2002-244775 A | 8/2002 |
| JP | 2006-60793 | 3/2006 |
| JP | 2007-35136 | 2/2007 |
| JP | 2008-17119 | 1/2008 |
| JP | 2009-70298 A | 4/2009 |

OTHER PUBLICATIONS

Chinese Office Action dated Dec. 12, 2011 from Chinese Application No. 201010142576.3.
Notification of Reason for Rejection dated Jan. 25, 2011 from Japanese Application No. 2009-091482.

* cited by examiner

*Primary Examiner* — Benjamin Lanier
*Assistant Examiner* — Abdulhakim Nobahar
(74) *Attorney, Agent, or Firm* — Beyer Law Group LLP

(57) ABSTRACT

After an initialization process (S10), the access controller of the external storage device performs authentication using a password (S20, S30). If authentication is successful, the successfully authenticated state is saved, and the host computer is notified that the HD storage portion is accessible (S40). Subsequently, it is decided whether SOF packets are being periodically sent from the host computer (S50), and if periodic sending has been interrupted (S50: NO), the connection to the host computer will be deemed lost, and the saved authenticated state will be deleted (S60).

4 Claims, 3 Drawing Sheets

EXTERNAL STORAGE DEVICE AND METHOD OF CONTROLLING THE DEVICE

BACKGROUND

1. Technical Field

The present invention relates to an external storage device designed to be attachable to and detachable from a host; and to a method of controlling the device.

2. Related Art

In the field of external storage devices (e.g. hard disk drives, USB memory, etc.), it is known to connect devices to a computer, printer, or similar device (a "host") utilizing a connection interface that supports hot plugging, such as the USB interface. By connecting such an external storage device to a host, data can be read from or written to the device; an added convenience is that the data is also portable. However, such external storage devices pose the risk that, if left unguarded with data stored therein, the data stored in the device may fall into the hands of others.

In the case of storage devices having password functionality based on the ATA standard for example, this issue is addressed by having the system BIOS generate a password, saving the password, and then using this same password to lock and unlock the device when starting up or shutting down the host computer. With regard to the external storage device, one proposed design detects when the power is turned on, and when the power has been turned on, the entire hard disk drive can be unlocked with the aforementioned password through an ATA security lock command; and when the power is turned off, an ATA security lock will be placed on the device (See, e.g., Japanese Publication No. 2007-35136).

However, in the prior art discussed above, due to the fact that the security lock is placed on the device only when power to the device is shut off, even if the host has been shut down a security lock will not be placed on the external storage device if the power to device has not been turned off. A resultant problem for external storage devices having an external power supply is that, after shutdown of the original host, if another host is connected to the external storage device with the device remaining connected to the external power supply, it may be possible to access data on the device, due to the fact that the power has not gone off and the security lock has not been applied, despite switching of the host.

An advantage of some aspects of the present invention is to make it possible to limit access to data in an external storage device in the event the connection from the host has been lost, even if power to the device has not been turned off.

The entire disclosure of Japanese patent application No. 2009-091482, of Buffalo is hereby incorporated by reference into this document.

SUMMARY

The present invention is addressed to attaining the object at least in part according to the following modes of the invention.

1. First Aspect

An external storage device adapted for detachable attachment to an external device, comprising:
  an interface configured to connect to the external device;
  a storage portion configured to encrypt and store data;
  a decryption portion configured to decrypt the stored data of the storage portion;
  an authentication portion configured to authenticate whether access to the storage portion from the external device via the interface is legitimate; and
  an access control portion configured to control access to the storage portion by the external device through the interface, wherein
  in case where the access to the storage portion from the external device is authenticated to be legitimate by the authentication portion, the access control portion performs permission control, wherein, in the permission control, the access control portion controls the decryption portion to decrypt the stored data of the storage portion according to access to the storage portion from the external device after the authentication; and
  in case where connection of the external device and the interface is lost, the access control portion performs prohibition control, wherein, in the prohibition control, the access control portion does not control the decryption portion to decrypt the stored data of the storage portion according to access to the storage portion from the external device even after the authentication.

According to this external storage device, if authentication is successful, the data in the storage portion will be decrypted, thus enabling access from an external device. Additionally, connection status with the external device will be monitored, and in the event that the connection has been lost, authenticated status will be revoked. Consequently, regardless of whether the power of the external storage device itself is on or off, authentication will be revoked if connection to the external device is lost due to shutdown of the device etc. Thus, in the event that the connection has been switched to another external device, the data in the storage portion will not be decrypted, thus eliminating the risk of data leakage.

2. Second Aspect

In the second aspect, the access control portion performs the prohibition control, in case where packets issued by the external device have not been received via the interface for a prescribed time interval or longer, as the case that the connection of the external device and the interface is lost.

According to this external storage device, if packets that are routinely issued periodically from an external device while the external device is connected are interrupted, it will be decided that the connection has been lost, allowing authenticated status to be revoked in a dependable manner in response to lost connection with the external device.

3. Third Aspect

In the third aspect, the interface is adapted to receive supply of power from the external device; and
  the access control portion performs the prohibition control, in case where the supply of power to the interface from the external device stops, as the case that the connection of the external device and the interface is lost.

According to this external storage device, if an external device of a type that supplies bus power has been connected, it will be decided that the connection has been lost in the event that bus power from the external device is disrupted due to device shutdown or the like.

4. Fourth Aspect

In the fourth aspect, the storage device further comprises: a authentication state storage portion configured to store information.

The access control portion stores in the authentication state storage portion information which shows the access from the external device is legitimate, in case where the access to the storage portion from the external device is authenticated to be legitimate by the authentication portion; and cancels the information of the legitimateness, in case where the connection of the external device and the interface is lost, wherein
  when access to the storage portion is required by the external device after the authentication that the access to the storage portion from the external device is legitimate, the access control portion performs the permission control, in case where the information of the legitimateness is stored in the authentication state storage portion and is not cancelled, and when access to the storage portion is required by the external device after the authentication that the access to the storage portion from the external device is legitimate, the access control portion performs the prohibition control, in case where the information of the legitimateness is not stored in the authentication state storage portion or is cancelled.

5. Fifth Aspect

A method of controlling an external device adapted to encrypt and store data in a storage portion, comprising steps of:

authenticating whether access to the storage portion from the external device is legitimate;

in case where the access to the storage portion from the external device is authenticated to be legitimate, performing decryption of stored data of the storage portion according to access to the storage portion from the external device after the authentication; and in case where the connection from the external device is lost, prohibiting decryption of the stored data of the storage portion according to access to the storage portion from the external device even after the authentication.

According to this control method, if authentication is successful, the data in the storage portion will be decrypted, thus enabling access from an external device. Additionally, connection status to the external device will be monitored, and in the event that the connection has been lost, authenticated status will be revoked. Consequently, regardless of whether the power of the external storage device itself is on or off, authentication will be revoked if connection to the external device is lost due to shutdown of the device etc. Thus, in the event that the connection has been switched to another external device, the data in the storage portion will not be decrypted, thus eliminating the risk of data leakage.

There are various possible modes for realizing the present invention, for example, an external storage device and a method of controlling an external storage device; a computer program for accomplishing the functions of such a device or control method; or a recording medium having such a computer program recorded thereon.

These and other objects, features, aspects, and advantages of the present invention will become more apparent from the following detailed description of the preferred embodiments with the accompanying drawings.

DESCRIPTION OF THE PREFERRED EMBODIMENTS

A. Embodiment 1

Figure 1:
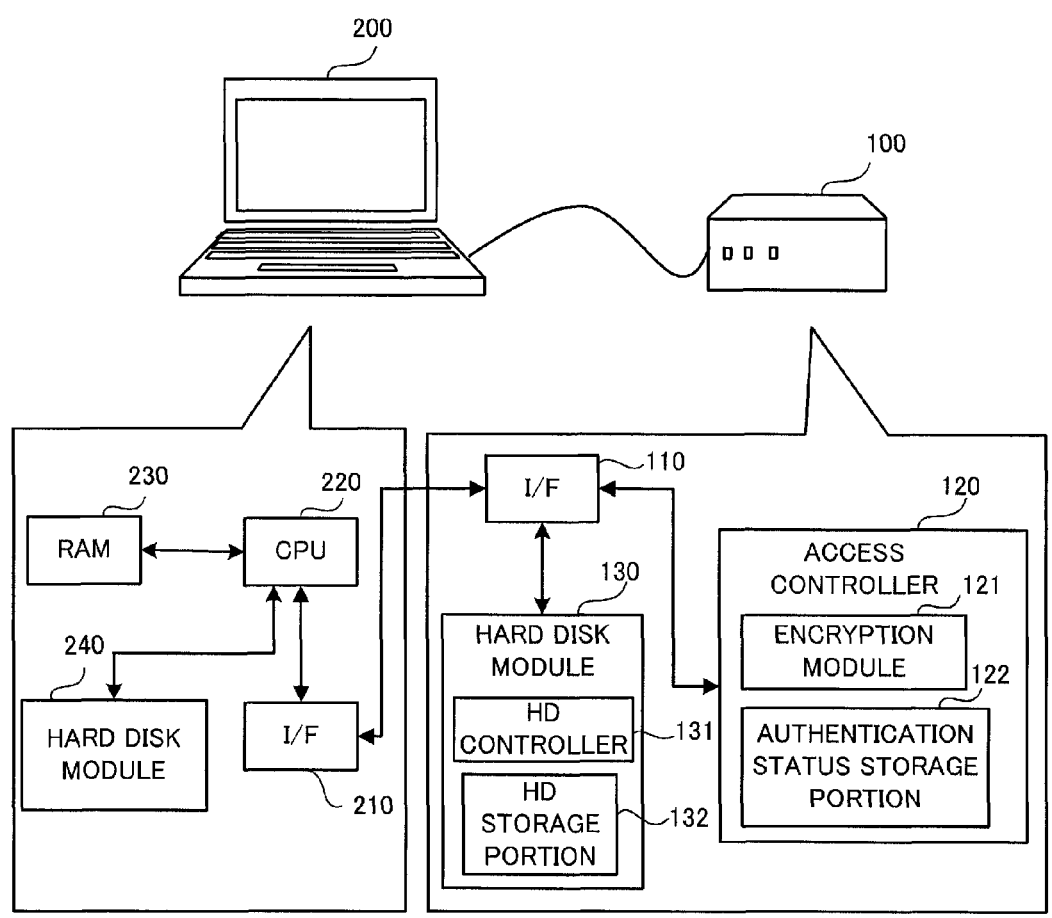
FIG. 1 depicts the general arrangement of an external storage device according to Embodiment 1 and of a host computer.

FIG. 1 depicts the general arrangement of an external storage device according to an embodiment of the present invention, and of a host computer to which the external storage device has been connected. The external storage device 100 is a storage device that has been designed to be detachably connectable to a host computer 200 through a USB (Universal Serial Bus) connection interface. The external storage device 100 can be configured as a hard disk drive, an SSD (solid state disk), or USB flash memory for example. The external storage device 100 has been furnished with a USB bus interface 110, an access controller 120, and a hard disk module 130.

The hard disk module 130 includes an HD controller 131 and an HD storage portion 132. The HD storage portion 132 is a storage portion composed of storage media. The HD controller 131 is a controller for controlling operation of the HD storage portion 132.

The access controller 120 is configured as a small microcomputer equipped with a CPU, RAM, ROM and so on, and also includes an encryption module 121 and an authentication status storage portion 122. The access controller 120 controls access to the hard disk module 130 from the host computer 200 through the USB bus interface 110. The access controller 120 also carries out communications for the purpose of performing various settings and control in relation to the USB connection between the external storage device 100 and the host computer 200. The encryption module 121 has the function of carrying out encryption and decryption of data stored in the HD storage portion 132. The authentication status storage portion 122 has the function of holding in memory authentication status that indicates whether authentication by an authentication program was successful or not. Details will be discussed later.

The encryption process module 121 is a hardware circuit for the purpose of enhancing security of the external storage device 100, and is designed to carry out an encryption process for encrypting data that is written to the HD storage portion 132 and decrypting data that is read from the HD storage portion 132. However, the encryption process module 121 need not be provided in the form of a hardware circuit, and could instead be provided as software, namely, an encryption process program stored in the HD storage portion 132.

The host computer 200 is furnished with a USB bus interface 210, a CPU 220, RAM 230, a hard disk module 240, a display portion (not shown), and an input portion (not shown). These component parts are connected to one another by an internal bus.

Figure 2:
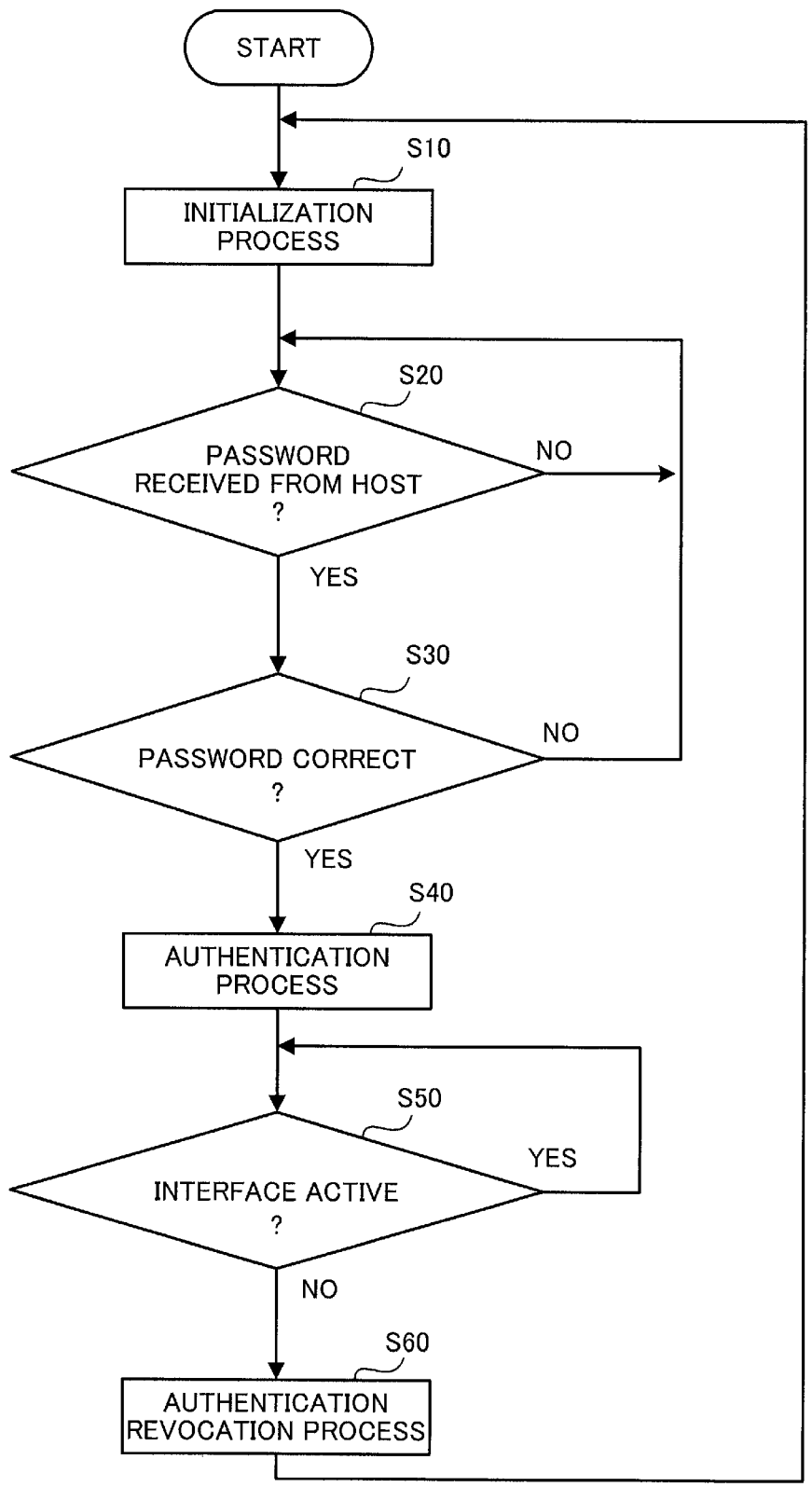
FIG. 2 is a flowchart depicting a control procedure that takes place when the external storage device according to Embodiment 1 is connected to a host computer.

FIG. 2 is a flowchart depicting the procedure of the control process of the external storage device 100. When the external storage device 100 is connected to the host computer 200, the USB bus interface 210 of the host computer 200 electrically detects the device connection.

Typically, when the host computer has detected connection of a USB-compliant device, an initialization process specified by USB standards is carried out between the device and the host computer (S10). As a specific example, steps to exchange a USB device request, to exchange descriptors (such as device class, vendor ID, product ID etc.), and to assign an address to the connected device is carried out. In this initialization process, the host computer acknowledges the connected device and establishes the device class of the connected device. The host computer also runs the appropriate device drivers for the established device class. Typically, the device class of a storage device is set to "mass storage class".

Subsequent to the initialization process, in accordance with USB standards the USB bus interface 210 of the host computer 200 periodically (e.g. every 125 μs in the case of a high speed connection) sends a SOF (Start of Frame) packet, which indicates the beginning of a frame, to the external storage device 100 through the USB cable. This SOF packet is composed of a SYNC (sync pattern), a PID (packet identifier), a Frame Number, and a CRC for detecting transmission errors. The USB bus interface 110 of the external storage device 100 receives the SOF packets and inputs them to the access controller 120.

Next, authentication of the encryption process by the encryption process module 121 is initiated. Specifically, via the display portion of the host computer 200, the encryption module 121 prompts the user to input a password. It then decides whether a password input from the input portion has been received through the USB bus interface 110 (S20). If a password has been received (S20: YES), it refers to an authentication table that has been saved in a memory area (not shown) to determine if the password is correct (S30). If the password is correct (S30: YES), it decides that authentication is successful, and executes the authentication process (S40).

Specifically, the access controller 120 is notified of successful authentication, whereupon the access controller 120 saves this "successfully authenticated state" to memory in the authentication status storage portion 122. The access controller 120 then notifies the host computer 200 that reading from the HD storage portion 132 and writing to the HD storage portion 132 is enabled. After that, in response to a read request from the host computer 200, the data is decrypted by the encryption module 121 and sent to the host computer 200. Also, write data from the host computer 200 is encrypted by the encryption module 121 and then written to the HD storage portion 132. If on the other hand user authentication has failed (S30: NO), access to the HD storage portion 132 is denied.

Next, by deciding whether SOF packets are being periodically received from the host computer 200, the access controller 120 decides whether the USB bus interface 110 is active (S50). If SOF packets are not being periodically received (S50: NO), for example if no SOF packets have been received for a 30-second interval, the USB bus interface 110 is deemed inactive, and an authentication revocation process is carried out (S60). Specifically, the "successfully authenticated state" that was saved to the authentication status storage portion 122 is deleted. The routine then returns to S10 and wait until the initialization process starts, triggered by detection of a device by the host computer 200. For example, if the host computer 200 is shut down, SOF packets are no longer received (S50), and the authentication revocation process takes place (S60). If the host computer 200 is subsequently restarted and the external storage device 100 is detected as a device, the initialization process of S10 is carried out.

More specifically, in response to the read request and the write request from the host computer 200, the access controller 120 performs the following operations. When the read request or the write request from the host computer 200 is received, the access controller refers the authentication status storage portion 122.

In case where data which shows "successfully authenticated state" is stored in the authentication status storage portion 122, the access controller 120 performs the following operations. In response to the read request from the host computer 200, the access controller 120 controls the encryption module 121 to decrypt the encrypted data in the HD storage portion 132 and sends the decrypted data to the host computer 200 via the USB bus interface 110. In response to the write request from the host computer 200, the access controller 120 controls the encryption module 121 to encrypt the data from the host computer 200 and writes the encrypted data into the HD storage portion 132.

In case where data which shows "successfully authenticated state" is not stored in the authentication status storage portion 122, the access controller 120 performs the following operations. In response to the read request from the host computer 200, the access controller 120 neither control the encryption module 121 to decrypt the encrypted data in the HD storage portion 132 nor send the decrypted data to the host computer 200 via the USB bus interface 110. In response to the write request from the host computer 200, the access controller 120 neither control the encryption module 121 to encrypt the data from the host computer 200 nor write the encrypted data in the HD storage portion 132.

As just described, the external storage device 100 according to Embodiment 1 has been designed so that if SOF packets are not periodically received from the host computer 200, the device will decide that the connection to the host computer 200 has been lost and will revoke the successfully authenticated state. Thus, even in cases where the external storage device 100 is driven by an external power supply and continues to be supplied with power, if the connection to the host computer 200 has been lost the successfully authenticated state will be revoked, so that if with the device remaining connected to the external power supply the USB bus interface 110 is connected to another host, re-authentication will be required, and the data stored in the HD storage portion will be protected.

B. Embodiment 2

Figure 3:
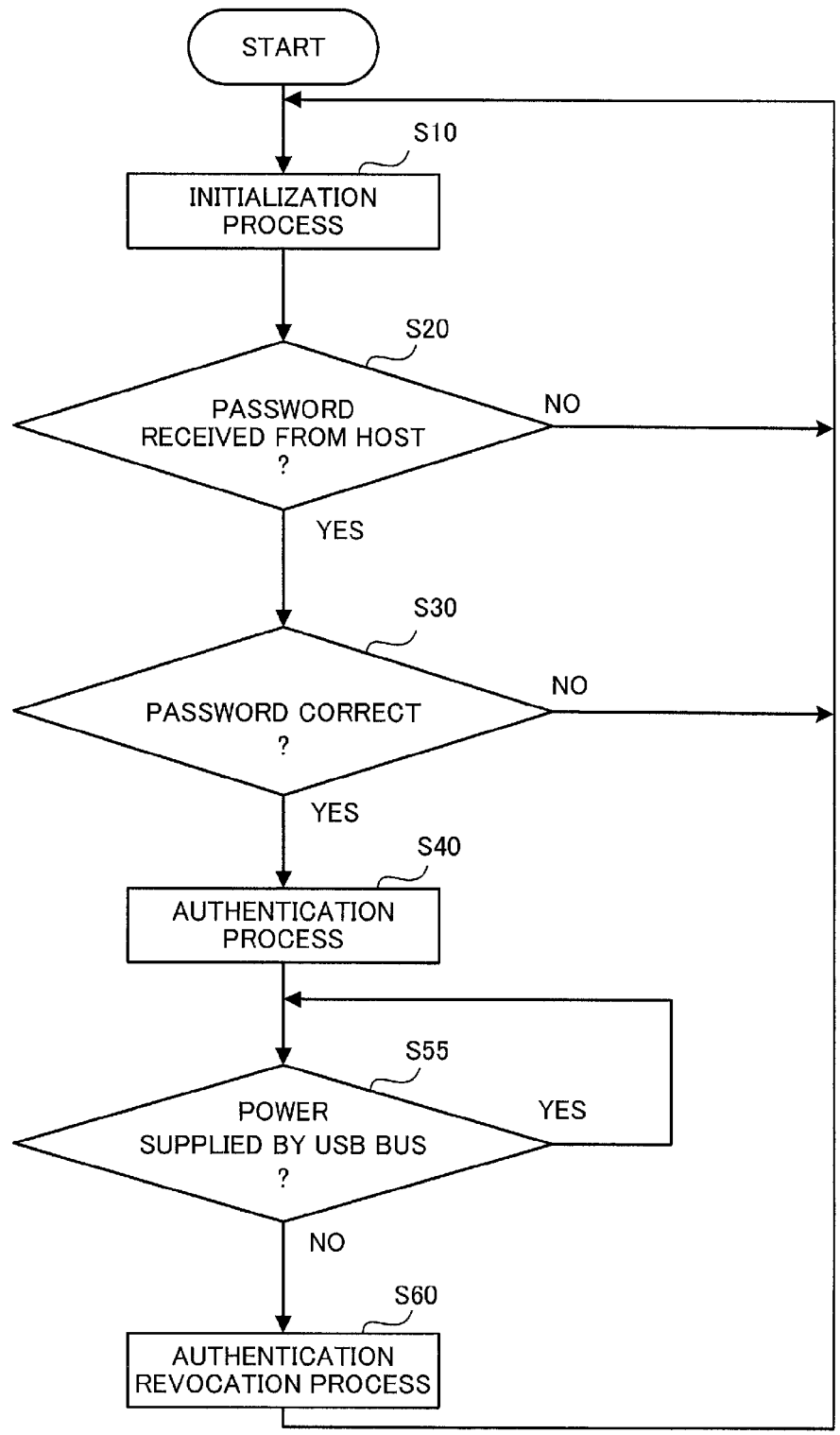
FIG. 3 is a flowchart depicting a control procedure that takes place when an external storage device according to Embodiment 2 is connected to a host computer.

FIG. 3 is a flowchart depicting the procedure of the control process of the external storage device 100 in Embodiment 2. The external storage device 100 of Embodiment 2 is able to utilize power supplied to it by the USB bus interface 210 of the host computer 200 (bus power). When the USB bus interface 110 is connected to the USB bus interface 210 of the host computer 200, the external storage device 100 will be supplied with 5 V power.

In Embodiment 2 as in Embodiment 1, when the external storage device 100 is connected to the host computer 200, the USB bus interface 210 of the host computer 200 will electrically detect the device connection. An initialization process specified by USB standards will be carried out (S10). The encryption module 121 will then perform authentication. Specifically, it will wait to receive a password from the host (S20), and depending on whether the password is correct will decide if authentication is successful (S30). If authentication is successful (S30: YES), "the successfully authenticated state" will be saved to memory in the authentication status storage portion 122, and an authentication process will take place to notify the host computer 200 that writing to the HD storage portion 132 is enabled (S40).

Next, rather than deciding whether the interface 110 is active, the access controller 120 will decide whether power is being supplied by the USB bus interface 210 of the host computer 200 (S55). If bus power continues to be supplied (S55: YES), it will decide that the host computer 200 is running and that connected status has not been lost, and will continue to monitor the supply of bus power. If on the other hand the supply of bus power has been disrupted (S55: NO), it will decide that connected status has been lost, and will carry out an authentication revocation process (S60). Specifically, the "successfully authenticated state" that was saved to the authentication status storage portion 122 will be deleted. The routine will then return to S10. For example, if the host computer 200 is shut down and bus power is no longer received (S50: NO), the authentication revocation process will take place (S60). If the host computer 200 is subsequently restarted and the external storage device 100 is detected as a device, the initialization process of S10 will be carried out.

As described above, the external storage device 100 according to Embodiment 2 has been designed so that if the supply of bus power from the USB bus interface 210 of the host computer 200 is disrupted, the device will decide that connection with the host computer 200 has been lost and will revoke the authenticated status. Thus, even in cases where the external storage device 100 is driven by an external power supply and continues to be supplied with power, the authenticated state will be revoked, if the supply of bus power is disrupted. Accordingly, if with the device remaining connected to the external power supply and the USB bus interface 110 is connected to another host, re-authentication will be required, and the data stored in the HD storage portion will be protected.

C. Modified Embodiments

The invention is not limited to the preferred embodiments described herein, and may be embodied in various other modes without departing from the spirit thereof, such as the following modifications for example.

In the above embodiments, if SOF packets are not being periodically received (S50: NO in FIG. 2 or 3), the data that shows the "successfully authenticated state" in the authentication status storage portion 122 is deleted. However, the data that shows the "unsuccessfully authenticated state" may be stored in the authentication status storage portion 122 in addition to the data that shows the "successfully authenticated state". In another aspect, the data that shows the "unsuccessfully authenticated state" may be stored in the authentication status storage portion 122 while the data that shows the "successfully authenticated state" is deleted.

The "unsuccessfully authenticated state" recorded in the authentication status storage portion 122 may be cancelled in any way.

In such aspects, in case where the data which shows "successfully authenticated state" is stored in the authentication status storage portion 122 without cancellation, the access controller 120 decrypts the encrypted data in the HD storage portion 132 and sends the decrypted data to the host computer 200, in response to the read request from the host computer 200. The access controller 120 encrypts the data from the host computer 200 and writes the encrypted data into the HD storage portion 132, in response to the write request from the host computer 200.

In case where the data which shows "successfully authenticated state" is not stored or the data is cancelled in the authentication status storage portion 122, the access controller 120 neither decrypt the encrypted data in the HD storage portion 132 nor send the decrypted data to the host computer 200, in response to the read request from the host computer 200. The access controller 120 neither encrypt the data from the host computer 200 nor write the encrypted data in the HD storage portion 132, in response to the write request from the host computer 200.

Some of the arrangements that have been implemented through hardware in the preceding embodiments may instead be implemented through software, and conversely some of the arrangements that have been implemented through software may instead be implemented through hardware. For example, some of the functions of the access controller 120 could be carried out by a program stored in the HD storage portion 132.

In the preceding embodiments, the external storage device 100 is connected through a USB interface. However, the connection interface between the external storage device 100 and the host computer 200 need not be USB, and could instead be the IEEE 1394 interface for example.

Moreover, while the preceding embodiments describe examples of a computer as the host connected to the external storage device 100, the host connected to the external storage device 100 could be any external device such as a printer, fax, or various digital home electronic devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An external storage device adapted for detachable attachment to an external device, comprising:
   an interface configured to connect to the external device;
   a storage portion configured to encrypt and store data;
   a decryption portion configured to decrypt the stored data of the storage portion;
   an authentication portion configured to authenticate whether access to the storage portion from the external device via the interface is legitimate; and
   an access control portion configured to control access to the storage portion by the external device through the interface, wherein
   in case where the access to the storage portion from the external device is authenticated to be legitimate by the authentication portion, the access control portion performs permission control, wherein, in the permission control, the access control portion controls the decryption portion to decrypt the stored data of the storage portion according to access to the storage portion from the external device being legitimate after the successful authentication;
   in case where connection between the external device and the interface is lost, the access control portion performs prohibition control, wherein, in the prohibition control, the access control portion does not control the decryption portion to decrypt the stored data of the storage portion according to access to the storage portion from the external device being legitimate even after the successful authentication; and
   an authentication state storage portion configured to store information, wherein
   the access control portion stores in the authentication state storage portion information which shows the access from the external device is legitimate, in case where the access to the storage portion from the external device is authenticated to be legitimate by the authentication portion; and cancels the information of the legitimateness, in case where the connection between the external device and the interface is lost, wherein
     when access to the storage portion is required by the external device after the authentication that the access to the storage portion from the external device is legitimate, the access control portion performs the permission control, in case where the information of the legitimateness is stored in the authentication state storage portion and is not cancelled, and
     when access to the storage portion is required by the external device after the authentication that the access to the storage portion from the external device is legitimate, the access control portion performs the prohibition control, in case where the information of the legitimateness is not stored in the authentication state storage portion or is cancelled.

2. The external storage device in accordance with claim 1 wherein
the access control portion performs the prohibition control, in case where packets issued by the external device have not been received via the interface for a prescribed time interval or longer, as the case that the connection between the external device and the interface is lost.

3. The external storage device in accordance with claim 1 wherein
the interface is adapted to receive supply of power from the external device; and
the access control portion performs the prohibition control, in case where the supply of power to the interface from the external device stops, as the case that the connection between the external device and the interface is lost.

4. A method of controlling an external storage device adapted to encrypt and store data in a storage portion of the external storage device, comprising steps of:
authenticating whether access to the storage portion from an external device is legitimate;
in case where the access to the storage portion from the external device is authenticated to be legitimate, performing decryption of stored data of the storage portion according to access to the storage portion from the external device being legitimate after the successful authentication and storing in an authentication state storage portion information which shows the access from the external device is legitimate; and
in case where the connection between the external device and the external storage device is lost, prohibiting decryption of the stored data of the storage portion according to access to the storage portion from the external device being legitimate even after the successful authentication and canceling the information of the legitimateness;
when access to the storage portion is required by the external device after the authentication that the access to the storage portion from the external device is legitimate,
performing the permission control, in case where the information of the legitimateness is stored in the authentication state storage portion and is not cancelled, and
when access to the storage portion is required by the external device after the authentication that the access to the storage portion from the external device is legitimate,
performing the prohibition control, in case where the information of the legitimateness is not stored in the authentication state storage portion or is cancelled.

* * * * *